Sept. 24, 1957  H. A. McDONALD  2,807,711
VEHICLE HEADLIGHT FOG ATTACHMENT
Filed Feb. 29, 1956

*INVENTOR:*
HORACE A. McDONALD
BY *Harry R. Lubcke*
AGENT

United States Patent Office 2,807,711
Patented Sept. 24, 1957

2,807,711
VEHICLE HEADLIGHT FOR ATTACHMENT
Horace A. McDonald, Los Angeles, Calif.
Application February 29, 1956, Serial No. 568,609
8 Claims. (Cl. 240—46.59)

My invention relates to vehicle headlight attachments and particularly to a readily detachable one for illuminating the road ahead during fog.

The efficacy of an amber headlight beam in usefully illuminating a road under fog conditions is known. However, many vehicles are not equipped with extra lights for this purpose. Also, I have found that the greater size and candlepower of regular headlights gives a stronger amber beam than the usual fog lights.

When regular headlights are thus modified for fog use it is important that the modification be readily attachable and detachable so that the usual white beam is readily available for ordinary weather conditions. It is also desirable that the attachment and detachment be accomplished without the use of tools and that a positive force hold the attachment to the headlight during use to prevent wind and other factors causing inoperability or damage.

An object of my invention is to provide an amber-beam-producing attachment for automobile and similar vehicle headlights which may be easily attached and detached at will.

Another object is to provide an attachment which is positively held in place by spring tension.

Another object is to provide an attachment which does not require a special headlight or attachment devices for its use.

Another object is to provide a headlight attachment which is relatively inexpensive to manufacture.

Figure 2:
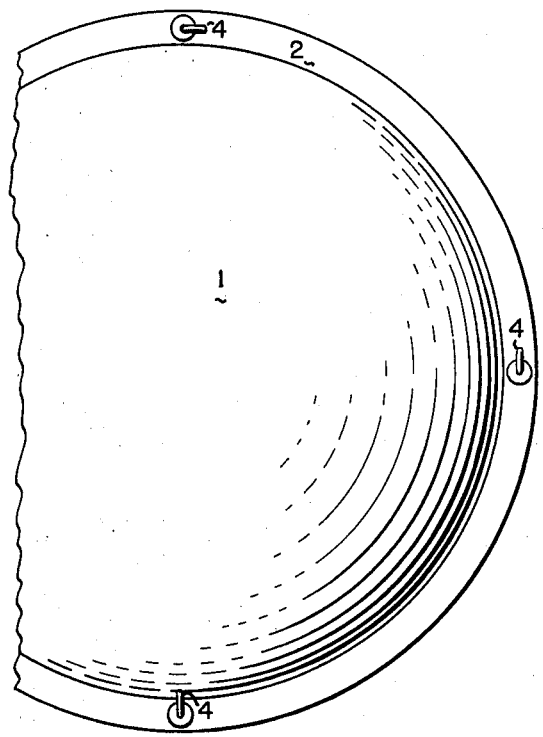
Figure 1:
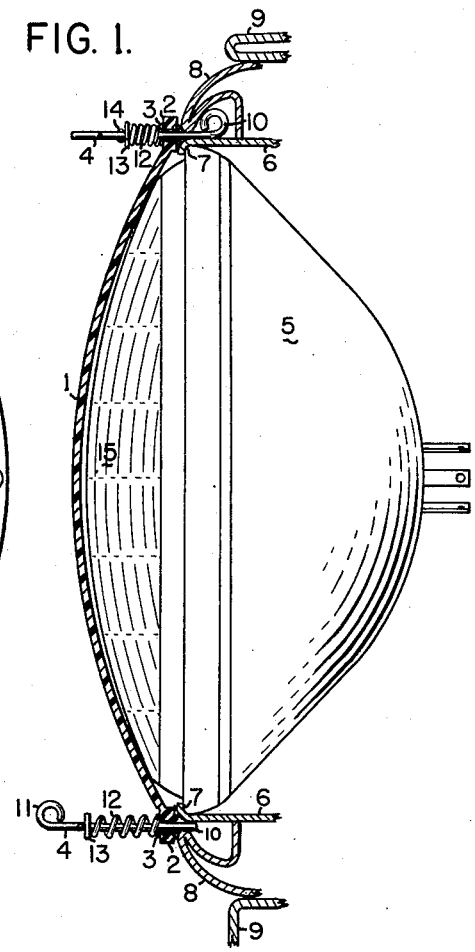
Figure 3:
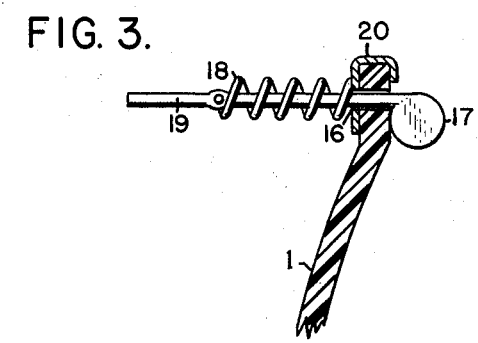

Other objects will become apparent upon reading the following detailed specification and upon examining the related drawings, in which:

Fig. 1 shows a headlight in elevation with the attachment and coacting parts in section, Fig. 2 shows the attachment in front elevation, and Fig. 3 shows an alternate form of attachment fitting in side elevation.

In Fig. 1 numeral 1 indicates the main member of my attachment. It is formed of a relatively stiff plastic or of cellulose acetate so as to be essentially nondeformable, yet not completely rigid or brittle. Molding is preferred but forming from sheet stock is possible. A suitable dye is included in compounding the composition to provide a slightly translucent substance having an amber color. This is regulated so that the light emitted from the headlight with the attachment in place is relatively monochromatic in the vicinity of the sodium line in the spectrum. It is not necessary that the monochromaticity be extreme, but a proper balance is to be struck between a substance which is too fully transparent and thus allows a considerable amount of white light to pass, as opposed to a substance too translucent which decreases the illumination of the beam below that obtained for approximate monochromaticity.

A planar flange 2 is required to have greater stiffness than the number proper and thus is conveniently made somewhat thicker. The flange is provided with a plurality of eyelets 3 as reinforcements for stem 4 of the attachment fitting. Four eyelets have been shown in Fig. 2. Stem 4 preferably has a curved loop or "crook" at each end, these being disposed at right angles, one to the other. Piano wire or equivalent temperable material is used, having a diameter of the order of 0.030 inch.

A sealed-beam automobile headlight of the known unitary construction is shown at 5 in Fig. 1. This may be of another type, however, since it is the rim of the light mounting with which my attachment coacts. Because of the wide use of the sealed-beam headlight the construction shown has become a standard in the art.

In the mounting, retaining ring 6 actually holds the sealed-beam unit because of forward lip 7. Rim 8 is the chrome-plated exterior piece which covers the adjusting screws, etc. of the mounting from view for reason of beauty, while element 9 is the sheet metal of an automobile fender or equivalent mounting. Rim 8 is invariably formed of the reentrant shape shown and I take advantage of this fact to fasten my attachment.

In the lower portion of Fig. 1 fitting stem 4 is shown before being inserted into the rim for actual fastening. A circumferential crevice or slot is always to be found between rim 8 and retaining ring 6. Stem 4 is rotated so that rear loop 10 is aligned parallel to this crevice and then pushed in. This motion compresses spring 12 from the uncompressed position shown at the bottom of Fig. 1 to the compressed position shown at the top of Fig. 1. Compression washer 13 coacts to accomplish this compression, the washer being limited in the distance which it can slip along the fitting by crimps 14 formed in the wire stem before tempering. When the operator has fully accomplished the insertion he turns loop 11 a quarter turn. This alters the configuration from that shown at the bottom of Fig. 1 to that shown at the top. The important difference is that loop 10 is now held in the reentrant portion of rim 8. With spring 12 thus compressed the fitting is held in that position until the operator reverses the procedure when the attachment is to be removed.

The simplicity and security of this means of attachment is apparent. It takes only a few seconds to insert and twist the fittings provided for attaching and a similarly short interval to twist and withdraw the fittings for removal. No tools are required. Because of the spring tension the attachment is firmly pressed against the ring of the headlight for desirable structural security.

In Fig. 2 a front view of the attachment is shown, with the fittings in the positions occupied at the top and bottom of Fig. 1 in the second figure. In alternate embodiments the number of fittings can be varied. For an inexpensive model three fittings equally spaced at 120° may be employed, while the use of five, six or perhaps eight also equally spaced may be justified in other models.

Although I prefer to form the member and flange exclusively of one material for economy in manufacturing the flange may be reinforced with an insert or over-covering of metal for additional strength. Not only may the over-covering be a separate part 20, of Fig. 3, suitably attached under eyelets or otherwise, but the same may be electroplated upon the flange or deposited by a metal deposition process as long as the temperature of application does not deform the plastic.

It is not necessary, though usually desirable, that the light-transmitting member 1 lie close to the front lens 15 of the headlight. Member 1 may be formed with a somewhat greater curvature than standard in order to allow flange 2 to fit snugly over all headlights.

It is also not necessary that a loop (11) be formed at the outside end of stem 4. This portion may be left straight or may be flattened by beating out the wire.

Rather than the conventional eyelet 3, any type of structural reinforcement may be employed for the holes through which the fittings extend; such as hardened plastic inserts, metal inserts molded in the plastic, or merely holes in the metal flange reinforcement when such is used. This is shown at 16 in Fig. 3.

Rather than the loop to engage within the crevice of the headlight mounting a flat portion 17 can be upset on the end of the wire by known working in the untempered state, as shown in Fig. 3. This is, in effect, a solid or "filled-in" loop. Also as an alternate, spring 18 is fastened through a small hole in stem 19 in Fig. 3, the stem being straight at the forward end in this showing.

Although the amber color is preferred for fog, various other colors or light polarizing agents may be formed in my attachment for other purposes.

While the greatest application of the attachment is for automobiles and trucks it is equally useful for motorboats, airplanes, airports, etc.

Having thus fully described my invention and the manner in which it is to be practiced, I claim:

1. A headlight attachment comprising a light transmissive member fittable upon a headlight having a surrounding crevice, said member having a surrounding flange, a plurality of spring fittings greater than two attached to said flange, each fitting having a rotatable stem with an enlarged portion, said portion proportioned to enter the crevice surrounding said headlight when said portion is aligned with said crevice, and said fitting adapted to retain said member to said headlight when said stem has been rotated approximately a quarter turn by said enlarged portion bearing upon the sides of said crevice.

2. A headlight attachment comprising a light transmissive member fittable over the front of a headlight having a surrounding crevice of varied width with depth, said member having a flange, a plurality of fittings greater than two attached to said flange, each fitting having a rotatable stem with an enlarged portion on at least one end, axial spring means upon said stem, said enlarged portion shaped to enter the crevice surrounding said headlight when said portion is aligned with said crevice, and said fitting adapted to spring-retain said member to said headlight when said stem has been revolved approximately a quarter turn by said enlarged portion bearing upon the sides of said crevice at the greater width within the depth thereof.

3. A headlight attachment comprising a light-transmissive member fittable upon the front of a headlight having a surrounding reentrant crevice, said member having a surrounding flange, more than two fittings attached to said flange, each fitting having a stem with an enlarged portion and spring means, said enlarged portion formed to enter the crevice surrounding said headlight when said portion is aligned with said crevice, and said spring means coacting with said enlarged portion adapted to retain said member to said headlight when said stem has been turned approximately a quarter turn to place said enlarged portion athwart the reentrant portion of said crevice.

4. In combination with a headlight having a reentrant crevice, a headlight attachment comprising a colored light-transmissive member having approximately the same shape as the front lens of said headlight, said member having a substantially stiff radial flange, a plurality greater than two of apertures in said flange, a fitting in each aperture, each said fitting having a stem with a loop in at least one end, a spring upon each stem, and means to limit the axial travel of said spring therealong, one loop of each said fitting adapted to enter the crevice surrounding said headlight when said loop is aligned parallel to said crevice and to retain said member to said headlight when each loop has been revolved approximately a quarter turn into the reentrant portion of said crevice.

5. In combination with a headlight having a surrounding reentrant crevice, a headlight attachment comprising a light-transmissive member having approximately the same shape as the front of the headlight, said member having a flange, more than two apertures in said flange, a fitting in each aperture, each said fitting having a stem with an enlarged portion on at least one end, a spring upon each stem, and means to limit the axial travel of said spring, said enlarged portion adapted to enter the crevice surrounding said headlight when said portion is aligned parallel to said crevice and to retain said member to said headlight by pressure of said spring exerted through said enlarged portion upon the reentrant portion of said crevice when said stem has been turned approximately a quarter turn axially.

6. In combination with a headlight having a surrounding reentrant crevice, a headlight attachment comprising an approximate sodium-spectrum-line colored light-transmissive member having approximately the same shape as the front lens of said headlight, said member having a substantially rigid peripheral radial flange, more than two reinforcements in said flange, a fitting in each reinforcement, each said fitting having a stem with a loop in at least one end, a spring upon each stem and a washer also thereupon, said washer limited in axial travel along said stem by a projection thereon, one loop of each said fitting adapted to enter the peripheral crevice surrounding said headlight when said loop is aligned parallel to said crevice and to retain said member to the reentrant portion of the crevice of said headlight under spring pressure when each loop has been revolved axially of said stem approximately a quarter revolution.

7. In combination with a headlight having a reentrant crevice, a headlight attachment comprising an approximate monochromatic sodium-line colored light-transmissive plastic member having approximately the same convexity as the front lens of a headlight, said member having a structurally rigid peripheral planar flange, a plurality greater than two of eyelets in said flange, a fitting in each eyelet, each said fitting having a wire stem with a loop at least at one end, a spring surrounding each stem and a washer also surrounding said stem, said washer limited in axial travel along said stem by a projection thereon, one loop of each of said fittings proportioned and positioned to enter the peripheral crevice between said headlight and the retaining ring therefor when said loop is aligned parallel to said crevice and to retain said member to the reentrant part of the crevice of said headlight under spring pressure when each fitting loop has been turned a quarter turn.

8. In combination with a headlight having a surrounding reentrant crevice, a vehicle headlight fog-beam attachment comprising a convex semi-translucent amber-colored dyed light-transmissive plastic member having approximately the same convexity as the front lens of a headlight, said member having a structurally rigid peripheral planar flange extending radially outward from the convex portion, more than two eyelets in said flange, a metal reinforcement of said flange held under said eyelets, a fitting in each eyelet, each said fitting having a wire stem with a loop at each end, a compression spring surrounding each stem and a washer adjacent to said spring on each stem on the side of said spring away from said flange, said washer limited in axial travel along said stem by projections thereon, one loop of each of said fittings shaped and positioned to enter the circumferential crevice between the vehicle headlight and the retaining ring therefor when the one loop is aligned parallel to said crevice and to retain said member to the reentrant part of the crevice of said headlight under spring pressure when each fitting loop has been axially revolved a quarter revolution.

References Cited in the file of this patent

UNITED STATES PATENTS

| | | |
|---|---|---|
| 2,270,814 | Scribner | Jan. 20, 1942 |
| 2,463,057 | Runge | Mar. 1, 1949 |
| 2,476,109 | Neitzel | July 12, 1949 |
| 2,499,555 | Wronkowski | Mar. 7, 1950 |